US006109689A

United States Patent [19]

Nanni

[11] Patent Number: 6,109,689

[45] Date of Patent: Aug. 29, 2000

[54] VEHICULAR SEAT MOTION DAMPING SYSTEM

[76] Inventor: George Nanni, 24001 Muirlands Blvd. SPC 376, Lake Forest, Calif. 92630-1713

[21] Appl. No.: 09/224,018

[22] Filed: Dec. 31, 1998

[51] Int. Cl.$^{7}$ .......... B60N 2/42

[52] U.S. Cl. .......... 297/216.1; 297/216.11; 297/216.18; 297/216.19; 296/65.02; 296/68.1; 248/638

[58] Field of Search .......... 297/216.1, 216.11, 297/261.18, 216.19, 216.2; 296/65.02, 68.1; 248/638, 624

[56] References Cited

U.S. PATENT DOCUMENTS 2,346,895 4/1944 Bergman .......... 297/216.18
3,986,748 10/1976 Magnuson .......... 296/65.02
4,412,595 11/1983 Kinzel .......... 297/216.1
5,685,603 11/1997 Lane, Jr. .......... 297/216.18

*Primary Examiner*—Anthony D. Barfield

[57] ABSTRACT

A vehicular seat motion damping system including at least one front vehicle seat having a lower extent with a top face, a bottom face and a periphery formed therebetween. The front vehicle seat further having an upper extent coupled at a bottom edge thereof to a rear edge of the lower extent and extending upwardly therefrom. The upper extent has a front face and a rear face. The vehicle seat is pivotally coupled about a horizontal axis to the vehicle. Further provided is at least one vertical spring coupled at a top end thereof to a roof of the vehicle and a bottom end thereof coupled to the upper extent of the vehicle seat. In use, the vertical spring has a biased orientation when the vehicle seat pivots forwardly as a result of a collision.

3 Claims, 3 Drawing Sheets

VEHICULAR SEAT MOTION DAMPING SYSTEM

BACKGROUND OF THE INVENTION

1. Field of the Invention

The present invention relates to a vehicular seat motion damping system and more particularly pertains to damping collision related forces acting on a vehicular seat and a rider situated therein.

2. Description of the Prior Art

The use of vehicle seat restraint mechanisms is known in the prior art. More specifically, vehicle seat restraint mechanisms heretofore devised and utilized for the purpose of preventing injury to a rider are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,720,139 to McSmith; U.S. Pat. No. 4,089,545 to Ferry; U.S. Pat. No. 3,953,068 to Porsche et al.; U.S. Pat. No. 4,232,895 to Yoshio et al.; U.S. Pat. No. 5,411,319 to Kuiri; and U.S. Patent Des. 354,629 to Chapman.

In this respect, the vehicular seat motion damping system according to the present invention substantially departs from the conventional concepts and designs of the prior art, and in so doing provides an apparatus primarily developed for the purpose of damping collision related forces acting on a vehicular seat and a rider situated therein.

Therefore, it can be appreciated that there exists a continuing need for a new and improved vehicular seat motion damping system which can be used for damping collision related forces acting on a vehicular seat and a rider situated therein. In this regard, the present invention substantially fulfills this need.

SUMMARY OF THE INVENTION

In view of the foregoing disadvantages inherent in the known types of vehicle seat restraint mechanisms now present in the prior art, the present invention provides an improved vehicular seat motion damping system. As such, the general purpose of the present invention, which will be described subsequently in greater detail, is to provide a new and improved vehicular seat motion damping system which has all the advantages of the prior art and none of the disadvantages.

To attain this, the present invention essentially comprises at least one front vehicle seat having a lower extent with a top face, a bottom face and a periphery formed therebetween. The front vehicle seat further has an upper extent coupled at a bottom edge thereof to a rear edge of the lower extent and extending upwardly therefrom. The upper extent includes a front face and a rear face with a head rest coupled to a top edge thereof. As best depicted in FIGS. 3 & 4, a horizontal sliding assembly includes an upper plate with a rectangular configuration coupled to the bottom face of the lower extent of the vehicle seat. The upper plate has a pair of parallel L-shaped guide rails formed on a bottom face thereof and depended downwardly therefrom between a front edge and a rear edge thereof. The upper plate further has a pair of slots formed adjacent opposite side edges thereof for allowing a horizontal spring to be situated about a corresponding elongated member defined by the slot. The horizontal springs are coupled at a front end thereof to the upper plate. Further included as a component of the horizontal sliding assembly is a lower plate also with a rectangular configuration. As shown in FIG. 4, the lower plate includes a pair of L-shaped grooves formed in a top face thereof between a front edge and a rear edge thereof for allowing horizontal slidable engagement therein of the L-shaped guide rails of the upper plate. It should be noted that the horizontal springs are coupled at a rear end thereof to the lower plate. As such, the horizontal springs have an unbiased orientation with the upper plate situated directly above the lower plate and a biased orientation with the upper plate situated forwardly with respect to the lower plate. As shown in FIG. 1, the lower plate is pivotally coupled at a rear edge to a floor board of the vehicle such that the seat is adapted to pivot forwardly and rearwardly about a horizontal axis. To preclude lateral movement, the lower plate further has a plurality of cylindrical posts coupled to a bottom face thereof and depending downwardly therefrom. Such post are adapted for being slidably engaged within apertures formed in the floorboard of the vehicle. With reference to FIGS. 1 & 2, a seat belt assembly is included with a waist belt having a pair of belts each coupled at a first end thereof to opposite side faces of the upper extent of the vehicle seat. Each belt of the waist belt has a free end. The seat belt assembly further includes a shoulder harness coupled at a first end thereof to a dispensing unit situated on the rear face of the upper extent of the vehicle seat. A second end of the shoulder harness is coupled to one of the free ends of the waist belt with a buckle mechanism releasable coupleable with a buckle mechanism coupled to the other free end of the waist belt. Finally, a pair of vertical springs are provided. As shown in FIG. 6, each spring has a loop coupled at a top end thereof for allowing the releasable coupling thereof to a pin situated on a roof of the vehicle. The vertical springs are further coupled at a bottom end thereof to the head rest. For protection purposes, the vertical springs each include a cloth sleeve situated thereon with a bottom end fixed to the headrest and a top end with pile fasteners situated thereon for allowing releasable coupling with pile fasteners situated about the pin of the roof of the vehicle. By this structure, the vertical springs have an unbiased orientation with the lower extent of the vehicle seat residing at a 15 degree angle with respect to the horizontal. The vertical springs further have a biased orientation with the vehicle seat pivoting forwardly as a result of a collision.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicular seat motion damping system which has all the advantages of the prior art vehicle seat restraint mechanisms and none of the disadvantages.

It is another object of the present invention to provide a new and improved vehicular seat motion damping system which may be easily and efficiently manufactured and marketed. It is a further object of the present invention to provide a new and improved vehicular seat motion damping system which is of a durable and reliable construction.

An even further object of the present invention is to provide a new and improved vehicular seat motion damping system which is susceptible of a low cost of manufacture with regard to both materials and labor, and which accordingly is then susceptible of low prices of sale to the consuming public, thereby making such vehicular seat motion damping system economically available to the buying public.

Still yet another object of the present invention is to provide a new and improved vehicular seat motion damping system which provides in the apparatuses and methods of the prior art some of the advantages thereof, while simultaneously overcoming some of the disadvantages normally associated therewith.

Still another object of the present invention is to damp collision related forces acting on a vehicular seat and a rider situated therein.

Lastly, it is an object of the present invention to provide a new and improved vehicular seat motion damping system including at least one front vehicle seat having a lower extent with a top face, a bottom face and a periphery formed therebetween. The front vehicle seat further having an upper extent coupled at a bottom edge thereof to a rear edge of the lower extent and extending upwardly therefrom. The upper extent has a front face and a rear face. The vehicle seat is pivotally coupled about a horizontal axis to the vehicle. Further provided is at least one vertical spring coupled at a top end thereof to a roof of the vehicle and a bottom end thereof coupled to the upper extent of the vehicle seat. In use, the vertical spring has a biased orientation when the vehicle seat pivots forwardly as a result of a collision.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
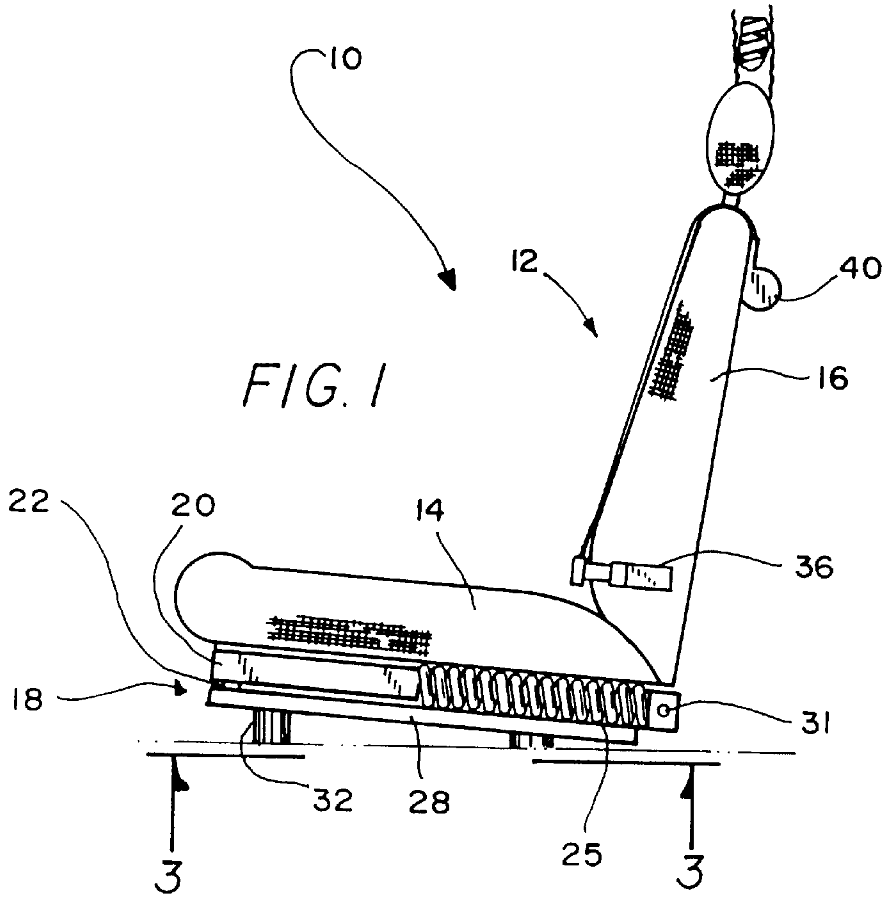
FIG. 1 is an illustration of the preferred embodiment of the vehicular seat motion damping system constructed in accordance with the principles of the present invention.

With reference now to the drawings, and in particular to FIG. 1 thereof, a new and improved vehicular seat motion damping system embodying the principles and concepts of the present invention and generally designated by the reference numeral 10 will be described.

The present invention, the new and improved vehicular seat motion damping system, is comprised of a plurality of components. Such components in their broadest context include at least one vehicle seat, a horizontal sliding assembly, a seat belt assembly, and a pair of vertical springs. Such components are individually configured and correlated with respect to each other so as to attain the desired objective.

More specifically, it will be noted that the system 10 of the present invention includes at least one front vehicle seat 12 having a lower extent 14 with a top face, a bottom face and a periphery formed therebetween. The front vehicle seat further has an upper extent 16 coupled at a bottom edge thereof to a rear edge of the lower extent and extending upwardly therefrom. The upper extent includes a front face and a rear face with a head rest coupled to a top edge thereof. It should be noted that a plurality of seats may be included each being subject to the principles and concepts to be set forth hereinafter.

Figure 3:
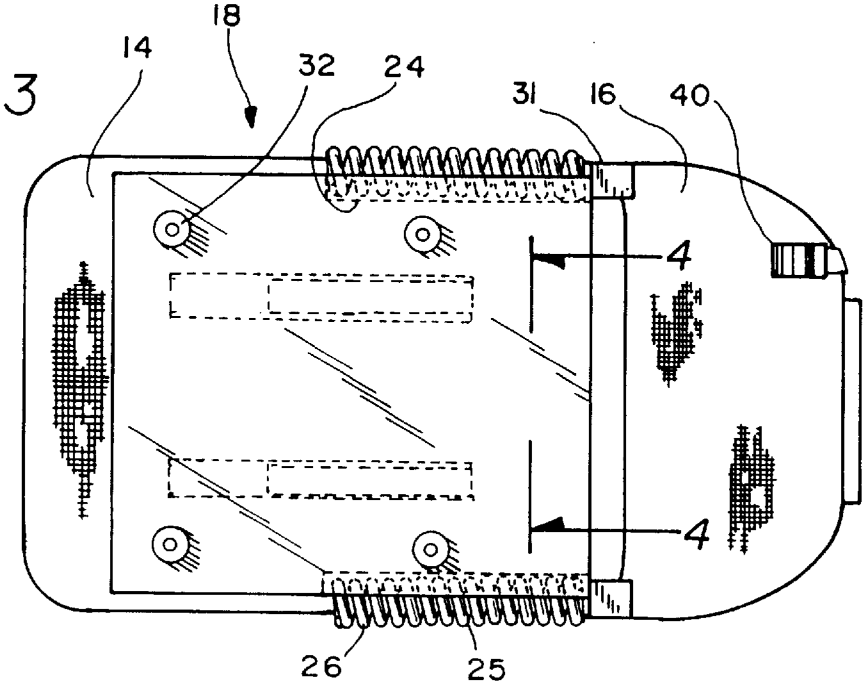
FIG. 3 is a bottom view of the present invention.
Figure 4:
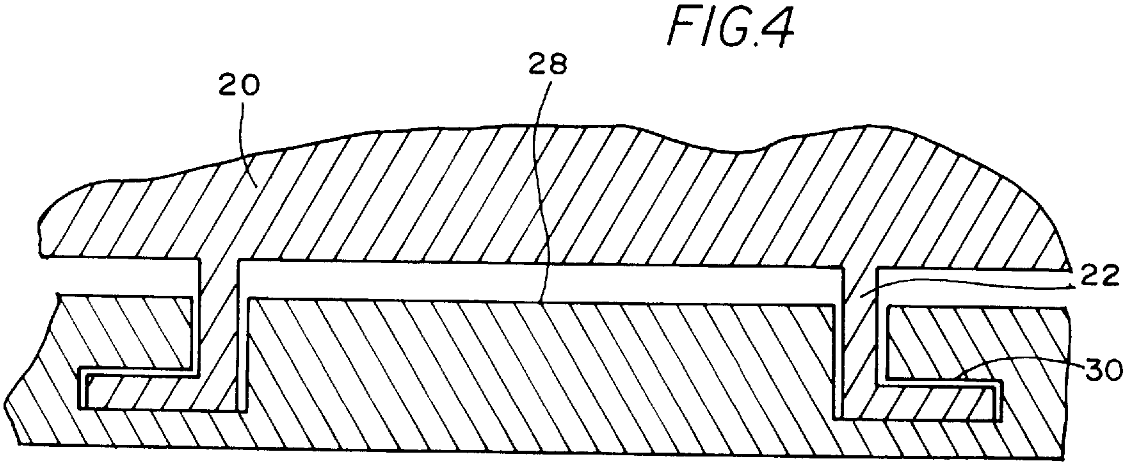
FIG. 4 is a cross-sectional view of the present invention taken along the horizontal sliding assembly of the present invention.

As best depicted in FIGS. 3 & 4, a horizontal sliding assembly 18 includes an upper plate 20 with a rectangular configuration coupled to the bottom face of the lower extent of the vehicle seat. The upper plate has a pair of parallel L-shaped guide rails 22 formed on a bottom face thereof and depended downwardly therefrom between a front edge and a rear edge thereof. The upper plate further has a pair of slots 24 formed adjacent opposite side edges thereof for allowing a horizontal spring 25 to be situated about a corresponding elongated member 26 defined by the associated slot. The horizontal springs are coupled at a front end thereof to the upper plate.

Further included as a component of the horizontal sliding assembly 18 is a lower plate 28 also with a rectangular configuration. As shown in FIG. 4, the lower plate includes a pair of L-shaped grooves 30 formed in a top face thereof between a front edge and a rear edge thereof for allowing horizontal slidable engagement therein of the L-shaped guide rails of the upper plate. It should be noted that the horizontal springs are coupled at a rear end thereof to the lower plate. As such, the horizontal springs have an unbiased orientation with the upper plate situated directly above the lower plate and a biased orientation with the upper plate situated forwardly with respect to the lower plate. Ideally, the horizontal springs are rated at 80 pounds.

As shown in FIG. 1, the lower plate is pivotally coupled at a rear edge to a floor board of the vehicle such that the seat is adapted to pivot forwardly and rearwardly about a horizontal axis. Such pivotal coupling, labeled 31 in FIG. 1, is integral with and situated slightly above the lower plate thereby affording a place for coupling the rear end of the springs. To preclude lateral movement, the lower plate further has a plurality of cylindrical posts 32 coupled to a bottom face thereof and depending downwardly therefrom. Such post are adapted for being slidably engaged within apertures formed in the floorboard of the vehicle.

Figure 2:
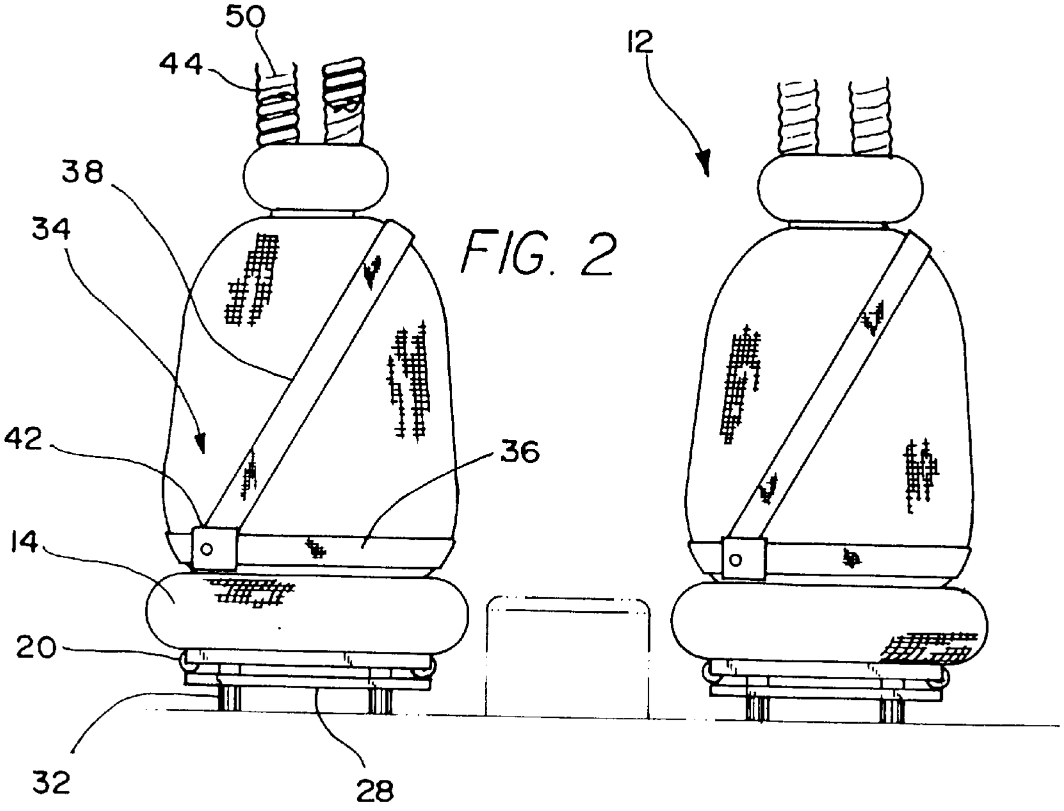
FIG. 2 is a front elevational view of the present invention.

With reference to FIGS. 1 and 2, a seat belt assembly 34 is included with a waist belt 36 having a pair of belts each coupled at a first end thereof to opposite side faces of the upper extent of the vehicle seat. Each belt of the waist belt has a free end. The seat belt assembly further includes a shoulder harness 38 coupled at a first end thereof to a dispensing unit 40 situated on the rear face of the upper extent of the vehicle seat. Preferably, the dispensing unit is situated adjacent the top edge of the upper extent of the vehicle seat. A second end of the shoulder harness is coupled to one of the free ends of the waist belt with a buckle mechanism 42 releasable coupleable with a buckle mechanism coupled to the other free end of the waist belt. It is imperative that the belts and harness be coupled to solely the seat so as to prevent injury to a rider which would occur if the belts were fixed with respect to the vehicle.

Figure 6:
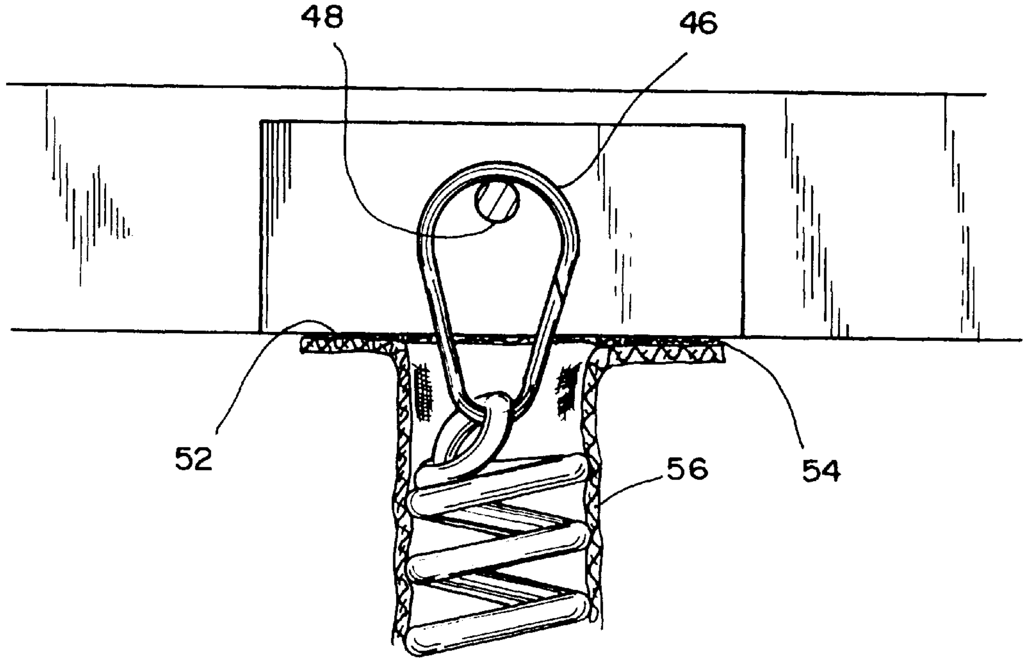
FIG. 6 is a cross-sectional view of the area encircled in FIG. 5.

Finally, a pair of vertical springs 44 are provided. As shown in FIG. 6, each spring has a loop 46 coupled at a top end thereof for allowing the releasable coupling thereof to a pin 48 situated on a roof of the vehicle. Preferably, the loop is a spring biased clip. The vertical springs are further coupled at a bottom end thereof to the head rest. Preferably, the vertical springs are rated at 80–100 pounds. For protection purposes, the vertical springs each include a cloth sleeve 50 situated thereon with a bottom end fixed to the headrest and a top end with pile fasteners 52 situated thereon for allowing releasable coupling with pile fasteners 54 situated around the pin of the roof of the vehicle. By this structure, the vertical springs have an unbiased orientation with the lower extent of the vehicle seat residing at a 15 degree angle with respect to the horizontal. The vertical springs further have a biased orientation when the vehicle seat pivots forwardly as a result of a collision.

Upon a collision, the tendency for a person to pivot and slide forward is combatted via the damping afforded by the unique implementation of the horizontal and vertical springs. As such, neck injuries and other ailments associated with the extreme forces applied to the body by the seat belt during a collision are abated.

Figure 5:
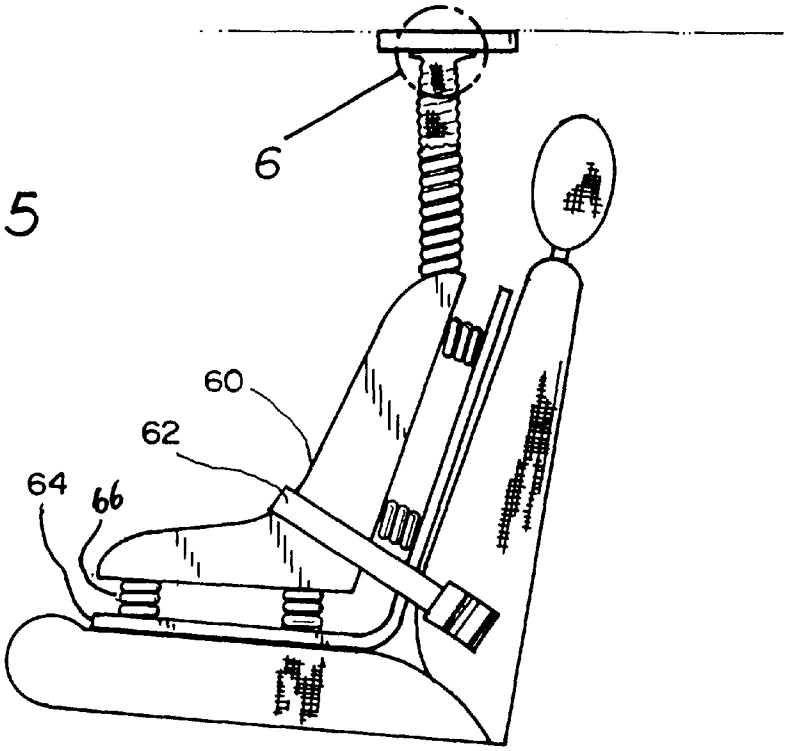
FIG. 5 is a side elevational view of an alternate embodiment of the present invention.

In an alternate embodiment, the above concepts are applied to a child seat 60. See FIG. 5. The pivotal coupling of the child seat is afforded by a conventional lap belt 62 coupled about an intersection of the upper extent and lower extent of the child seat. The child seat further includes an L-shaped frame 64 situated between the child seat and a conventional rear seat of the vehicle. The L-shaped frame has a horizontal portion and a vertical portion constructed from a material from the group of materials including foam. A plurality of auxiliary springs 66 are coupled between the bottom of the lower extent of the child seat and the horizontal portion of the frame and between the rear face of the upper extent of the child seat and the vertical portion of the frame. As such, the auxiliary springs each are adapted to damp movement of the child seat during and immediately following a collision. For example, upon a collision, the vertical springs work in conjunction with the springs of the horizontal portion of the frame to damp the initial tendency of the child seat to pivot forward. After such, the springs of the vertical portion of the frame work in conjunction with the vertical springs to damp the tendency of the child seat to pivot suddenly rearwardly which is common after a collision. It should be noted that the releasable nature of the top end of the vertical springs as described hereinabove is especially useful with the present embodiment since it is common for the child seat to be removed frequently.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A vehicular seat motion damping system in a vehicle being of the type having a floorboard, the system comprising, in combination:

at least one front vehicle seat having a lower extent with a top face, a bottom face and a periphery formed therebetween, the front vehicle seat further having an upper extent coupled at a bottom edge thereof to a rear edge of the lower extent and extending upwardly therefrom, the upper extent having a front face and a rear face with a head rest coupled to a top edge thereof;

a horizontal sliding assembly including an upper plate with a rectangular configuration coupled to the bottom face of the lower extent of the vehicle seat, the upper plate having a pair of parallel L-shaped guide rails formed on a bottom face thereof and depending downwardly therefrom between a front edge and a rear edge thereof, the upper plate further having a pair of slots formed adjacent opposite side edges thereof a horizontal spring situated about a corresponding elongated member defined by the slot, wherein the horizontal springs are coupled at a front end thereof to the upper plate, the horizontal sliding assembly further having a lower plate with a rectangular configuration, the lower plate having a pair of L-shaped grooves formed in a top face thereof between a front edge and a rear edge thereof for allowing horizontal slidable engagement therein of the L-shaped guide rails of the upper plate, wherein the horizontal springs are coupled at a rear end thereof to the lower plate such that the horizontal springs have an unbiased orientation with the upper plate situated directly above the lower plate and a biased orientation with the upper plate situated forwardly with respect to the lower plate;

said lower plate pivotally coupled at a rear edge to the floor board of the vehicle such that the seat is adapted to pivot forwardly and rearwardly about a horizontal axis, the lower plate further having a plurality of cylindrical posts coupled to a bottom face thereof and depending downwardly therefrom for being slidably engaged within apertures formed in the floorboard of the vehicle;

a seat belt assembly including a waist belt with a pair of belts each coupled at a first end thereof to opposite side faces of the upper extent of the vehicle seat and each having a pair of free ends, the seat belt assembly further including a shoulder harness coupled at a first end thereof to a dispensing unit situated on the rear face of the upper extent of the vehicle seat and a second end coupled to one of the free ends of the waist belt with a buckle mechanism releasably coupleable with a buckle mechanism coupled to the other free end of the waist belt; and a pair of vertical springs having a loop coupled at a top end thereof for allowing the releasable coupling thereof to a pin situated on a roof of the vehicle and coupled at a bottom end thereof to the head rest, the vertical springs including a cloth sleeve situated thereon with a bottom end fixed to the headrest and a top end with pile fasteners situated thereon for allowing releasable coupling with pile fasteners situated about the pin of the roof of the vehicle, the vertical springs having an unbiased orientation with the lower extent of the vehicle seat residing at a 15 degree angle with respect to the horizontal and a biased orientation with the vehicle seat pivoting forwardly as a result of a collision.

2. A vehicular seat motion damping system comprising:

at least one front vehicle seat having a lower extent with a top face, a bottom face and a periphery formed therebetween, the front vehicle seat further having an upper extent coupled at a bottom edge thereof to a rear edge of the lower extent and extending upwardly therefrom, the upper extent having a front face and a rear face, wherein the vehicle seat is pivotally coupled to a vehicle;

at least one vertical spring coupled at a top end thereof to a roof of the vehicle and a bottom end thereof coupled to the upper extent of the vehicle seat, the vertical spring having a biased orientation with the vehicle seat pivoting forwardly as a result of a collision;

wherein the seat is a child seat and the pivotal coupling is afforded by a conventional lap belt coupled about an intersection of the upper extent and lower extent of the child seat, the child seat further including an L-shaped frame with a horizontal portion and a vertical portion constructed from a foam, a plurality of auxiliary springs are coupled between the bottom of the lower extent of the child seat and the horizontal portion of the frame and between the rear face of the upper extent of the child seat and the vertical portion of the frame, the auxiliary springs each adapted to damp movement of the child seat during and immediately following a collision.

3. A vehicular seat motion damping system comprising:

at least one front vehicle seat having a lower extent with a top face, a bottom face and a periphery formed therebetween, the front vehicle seat further having an upper extent coupled at a bottom edge thereof to a rear edge of the lower extent and extending upwardly therefrom, the upper extent having a front face and a rear face; and a horizontal sliding assembly including an upper plate with a rectangular configuration coupled to the bottom face of the lower extent of the vehicle seat, the upper plate having a pair of parallel L-shaped guide rails formed on a bottom face thereof and depending downwardly therefrom between a front edge and a rear edge thereof, the upper plate further having a pair of slots formed adjacent opposite side edges thereof, a horizontal spring situated about a corresponding elongated member defined by the slot, wherein the horizontal springs are coupled at a front end thereof to the upper plate, the horizontal sliding assembly further having a lower plate with a rectangular configuration, the lower plate having a pair of pair of L-shaped grooves formed in a top face thereof between a front edge and a rear edge thereof for allowing horizontal slidable engagement therein of the L-shaped guide rails of the upper plate, wherein the horizontal springs are coupled at a rear end thereof to the lower plate such that the horizontal springs have an unbiased orientation with the upper plate situated directly above the lower plate and a biased orientation with the upper plate situated forwardly with respect to the lower plate.

* * * * *